(12) United States Patent
Chen et al.

(10) Patent No.: US 6,196,571 B1
(45) Date of Patent: Mar. 6, 2001

(54) FOLDING RELEASE DEVICE FOR A STROLLER

(75) Inventors: Er-Jui Chen, Kaohsiung; Hung-Chung Hou, Chiayi Hsien, both of (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 09/363,650

(22) Filed: Jul. 30, 1999

(30) Foreign Application Priority Data

Oct. 6, 1998 (TW) ................................................ 87216517

(51) Int. Cl.[7] ........................................................ B62B 3/02
(52) U.S. Cl. ............................ 280/647; 280/650; 280/658
(58) Field of Search .................................... 280/642, 647, 280/649, 650, 655, 657, 658, 47.38

(56) References Cited

U.S. PATENT DOCUMENTS

| | | | | |
|---|---|---|---|---|
| 4,848,787 | * | 7/1989 | Kassai | 280/642 |
| 5,244,228 | * | 9/1993 | Chiu | 280/650 |
| 5,427,402 | * | 6/1995 | Huang | 280/650 |
| 5,460,398 | * | 10/1995 | Huang | 280/650 |
| 5,634,654 | * | 6/1997 | Lin | 280/642 |
| 5,865,460 | * | 2/1999 | Huang | 280/642 |
| 5,938,230 | * | 8/1999 | Huang et al. | 280/642 |

FOREIGN PATENT DOCUMENTS

| | | | | |
|---|---|---|---|---|
| 258826 | * | 3/1988 | (EP) | 280/642 |
| 483042 | * | 4/1992 | (EP) | 280/642 |
| 2502569 | * | 10/1982 | (FR) | 280/658 |

* cited by examiner

Primary Examiner—Frank Vanaman
(74) Attorney, Agent, or Firm—Rabin & Champagne, P. C.

(57) ABSTRACT

A stroller includes a pair of front legs, a pair of rear legs, and an inverted U-shaped handle having two push bars. A folding release device includes a front coupling base secured on the upper end of each of the two front legs and having a lug containing a locking cavity, a hollow rear coupling base secured on the lower end of each of the two push bars, pivotally attached to the upper end of each of the two rear legs, and detachably secured to the front coupling base, a connecting sleeve having a first end secured to the lower end of each of the two push bars and a second end pivotally attached to the front coupling base, a locking shaft slidably mounted in the connecting sleeve and detachably received in the locking cavity, a slide bracket slidably mounted in the rear coupling base to move the locking shaft to detach from the locking cavity, a push button pivotally mounted on the top of the rear coupling base to press the slide bracket downward, and a safety knob mounted in the rear coupling base to stop the movement of the slide bracket.

10 Claims, 7 Drawing Sheets

FOLDING RELEASE DEVICE FOR A STROLLER

CROSS-REFERENCES TO RELATED APPLICATIONS

Not Applicable.

BACKGROUND OF THE INVENTION

1. Field of the Invention

The present invention relates to a folding release device, and more particularly to a folding release device for a stroller.

2. Description of the Related Art

The closest prior art of which the applicant is aware is disclosed in U.S. Pat. No. 5,775,718 to Huang, filed on Apr. 17, 1996, entitled "Folding Assembly For A Trolley".

BRIEF SUMMARY OF THE INVENTION

In accordance with one aspect of the present invention, there is provided a folding release device for a stroller which includes a pair of front legs, a pair of rear legs, and a substantially inverted U-shaped handle having two push bars.

The folding release device comprises a front coupling base secured on the upper end of each of the two front legs and having a first end and a second end, and a lug extending from the second end of the front coupling base and containing a locking cavity therein; a hollow rear coupling base secured on the lower end of each of the two push bars and pivotally mounted on the upper end of each of the two rear legs, the rear coupling base having a first end and a second end, the first end detachably secured to the second end of the front coupling base; a connecting sleeve having a first end secured to the lower end of each of the two push bars and a second end pivotally mounted to the front coupling base; a locking shaft slidably mounted in the connecting sleeve and detachably received in the locking cavity; a slide bracket slidably mounted in the rear coupling base to move the locking shaft to detach from the locking cavity; a push button pivotally mounted on the top of the rear coupling base to press the slide bracket downward; and a safety knob mounted in the rear coupling base to stop the movement of the slide bracket.

DETAILED DESCRIPTION OF THE INVENTION

Figure 1:
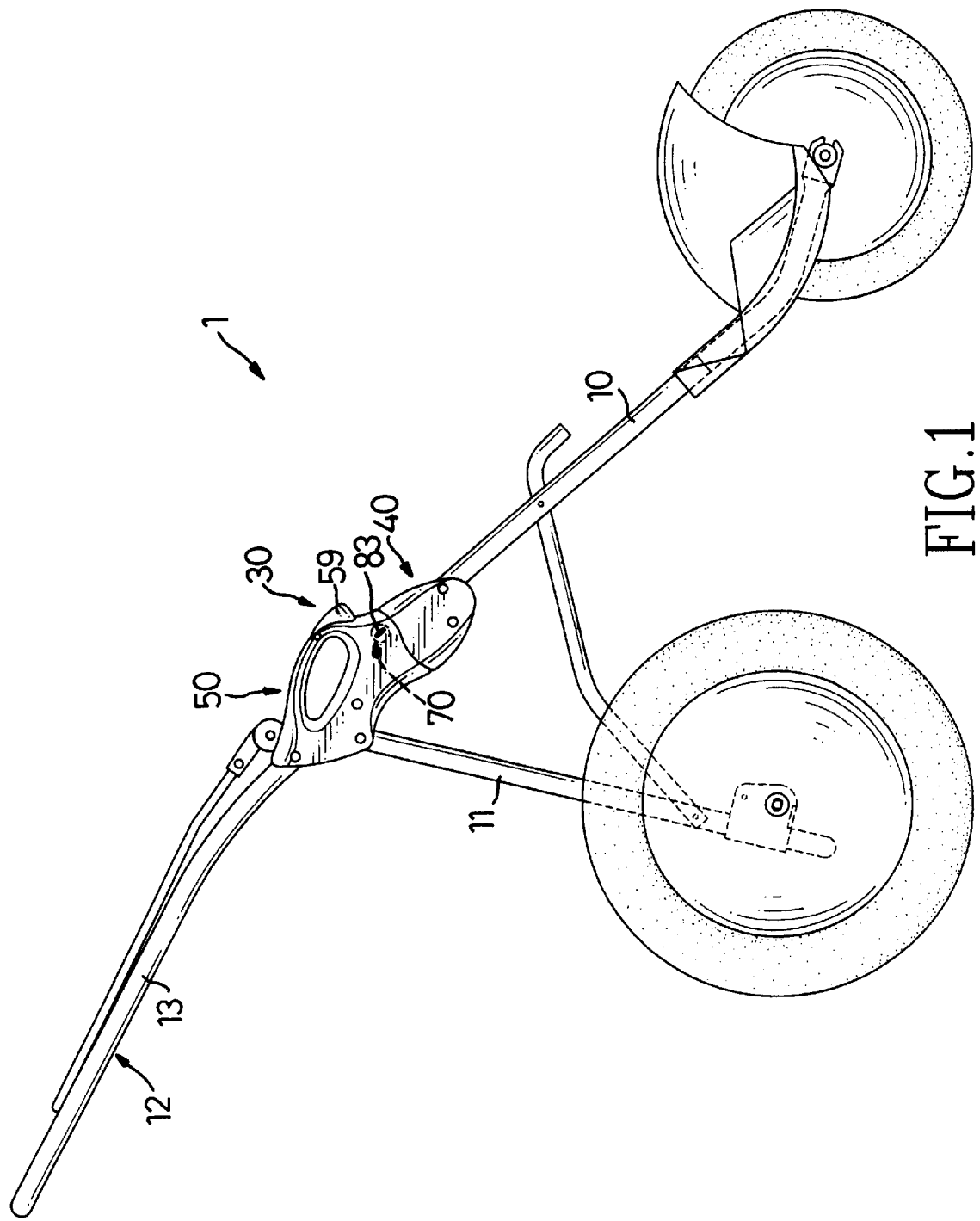
FIG. 1 is a side plan view of a folding release device for a stroller in accordance with the present invention.

Referring to the drawings and initially to FIGS. 1–4, a folding release device (30) in accordance with the present invention can be adapted to suit a stroller (1) which includes a pair of front legs (10), a pair of rear legs (11), and a substantially inverted U-shaped handle (12) including two push bars (13).

The folding release device (30) comprises a front coupling base (40) secured on the upper end of each of the two front legs (10) and having a first end and a second end, and a lug (45) extending from the second end of the front coupling base (40) and containing a locking cavity (46) therein, a hollow rear coupling base (50) secured on the lower end of each of the two push bars (13) and pivotally mounted on the upper end of each of the two rear legs (11), the rear coupling base (50) having a first end and a second end, the first end detachably secured to the second end of the front coupling base (40), a connecting sleeve (14) having a first end secured to the lower end of each of the two push bars (13) and a second end pivotally attached to the front coupling base (40), a locking shaft (16) slidably mounted in the connecting sleeve (14) and detachably received in the locking cavity (46), a slide bracket (60) slidably mounted in the rear coupling base (50) to detach the locking shaft (16) from the locking cavity (46), a push button (59) pivotally mounted in an opening (53) contained in the top of the rear coupling base (50) to press the slide bracket (17) downward, and a safety knob (70) mounted in the rear coupling base (50) to stop the movement of the slide bracket (60).

The front coupling base (40) contains a receiving channel (43) to receive the upper end of the front leg (10) therein, and a locking pin (410) in turn extending through a through bore (41) contained in the first end of the front coupling base (40), and a locking hole (100) contained in the upper end of the front leg (10), thereby securing the front coupling base (40) to the front leg (10).

The folding release device (30) comprises a locking pin (570) in turn extending through a through bore (57) contained in the first end of the rear coupling base (50), and a locking hole (131) contained in the lower end of the push bar (13), and a locking pin (580) in turn extending through a through bore (58) contained in the second end of the rear coupling base (50), and a locking hole (132) contained in the lower end of the push bar (13), thereby securing the rear coupling base (50) to the push bar (13).

The front coupling base (40) contains a receiving opening (44) to receive the connecting sleeve (14) therein, and the folding release device (30) comprises a retaining pin (420) in turn extending through a through bore (42) contained in the first end of the front coupling base (40), and a retaining hole (141) contained in the second end of the connecting sleeve (14), thereby pivoting the connecting sleeve (14) to the front coupling base (40).

The rear coupling base (50) includes two spaced upright guide plates (56) each extending downward from the opening (53), the connecting sleeve (14) contains an elongated guide slot (15) defined in the first end thereof, the slide bracket (60) is slidably received between the two guide plates (56) and includes a top plate (61) abutting the push button (59), two side plates (62) each abutting the connecting sleeve (14) and each containing an oblique slot (63) aligning with the guide slot (15), and a biasing member (64) mounted between the top plate (61) and the connecting sleeve (14).

The folding release device (30) comprises a slide plate (18) slidably received in the connecting sleeve (14) and having a first end containing a first hole (182) and a second end containing a second hole (181), and a slide shaft (17) in turn extending through the oblique slot (63) of each of the two side plates (62) of the slide bracket (60), through the guide slot (15), and through the first hole (182). The locking shaft (16) in turn extends through the locking cavity (46), through the guide slot (15), and through the second hole (181).

Each of the side plates (62) of the slide bracket (60) contains a retaining notch (621) therein, and the safety knob (70) includes an outer socket (80) secured in the rear coupling base (50) and containing an elongated slide channel (84) facing the retaining notch (621), an inner socket (71) slidably mounted in the outer socket (80) and including a stop block (76) slidably received in the slide channel (84) and detachably received in the retaining notch (621) of one of the two side plates (62) of the slide bracket (60), and a biasing member (77) mounted between the inner socket (71) and the outer socket (80).

The outer socket (80) contains two radially opposite limit slots (81), and the inner socket (71) includes two radially opposite resilient retaining hooks (72) each formed by a U-shaped slit (721) defined in the periphery of the inner socket (71) and each slidably received in one of the two corresponding limit slots (81).

The rear coupling base (50) includes a first side wall (54) containing a through hole (55) to receive the outer socket (80) therein, and a second side wall (541) containing an oblique locking slot (552) therein, and the outer socket (80) includes a rib (83) extending outward and secured in the locking slot (552), thereby securing the outer socket (80) to the rear coupling base (50). The inner socket (71) includes a press portion (712) formed on the bottom thereof and extending outward from the through hole (55). The through hole (55) contains a depression (551) therein to allow passage of the stop block (76).

Figure 2:
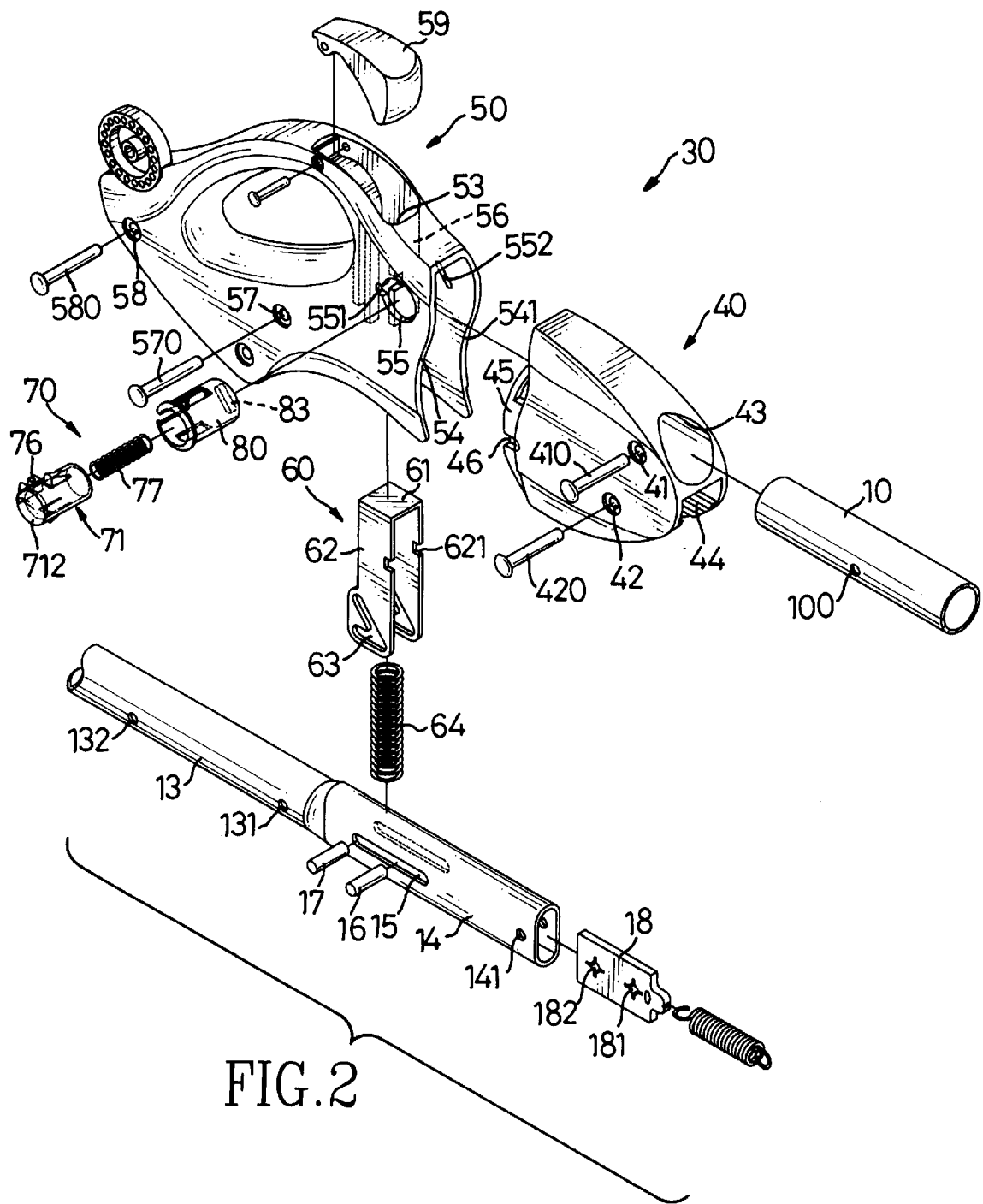
FIG. 2 is an exploded perspective view of the folding release device as shown in FIG. 1.
Figure 3:
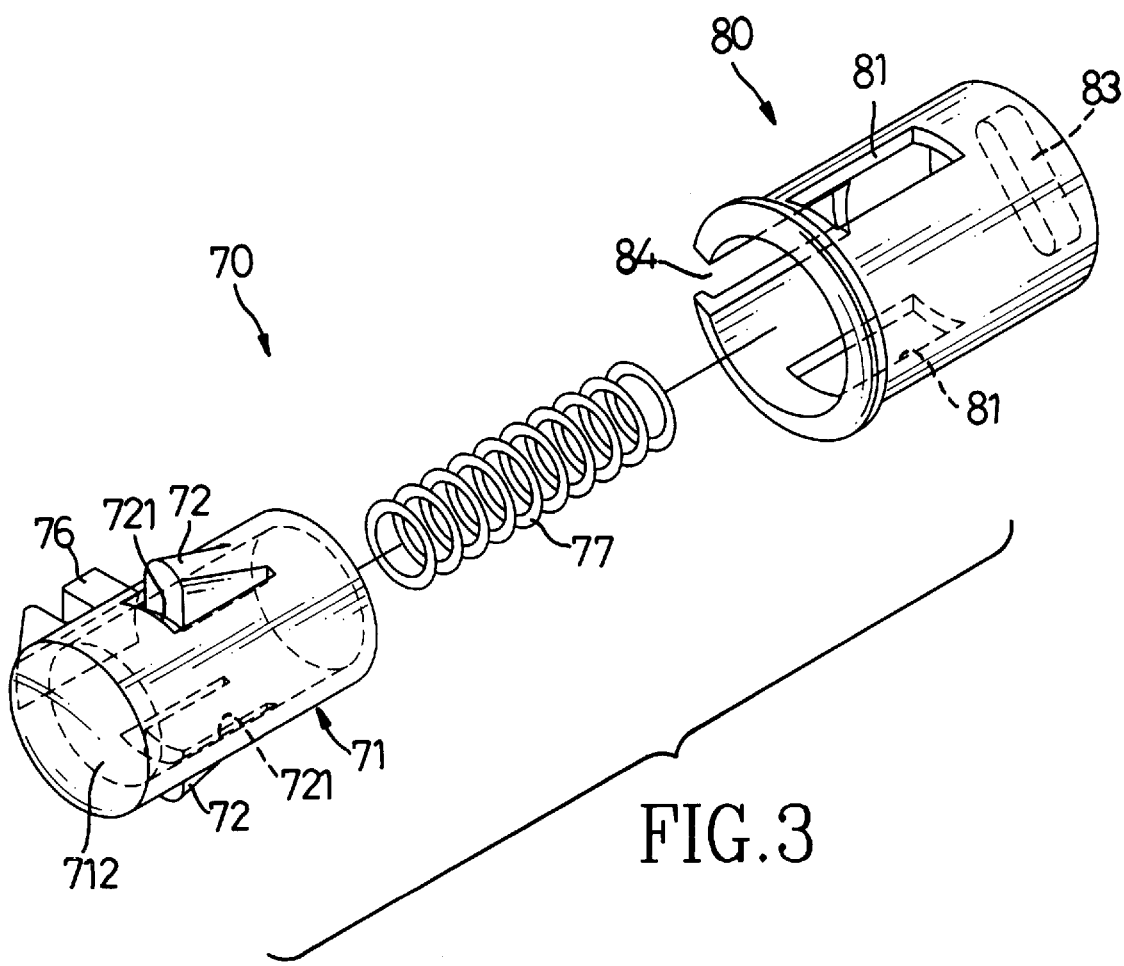
FIG. 3 is an exploded perspective view of the safety knob of the folding release device as shown in FIG. 2.
Figure 5:
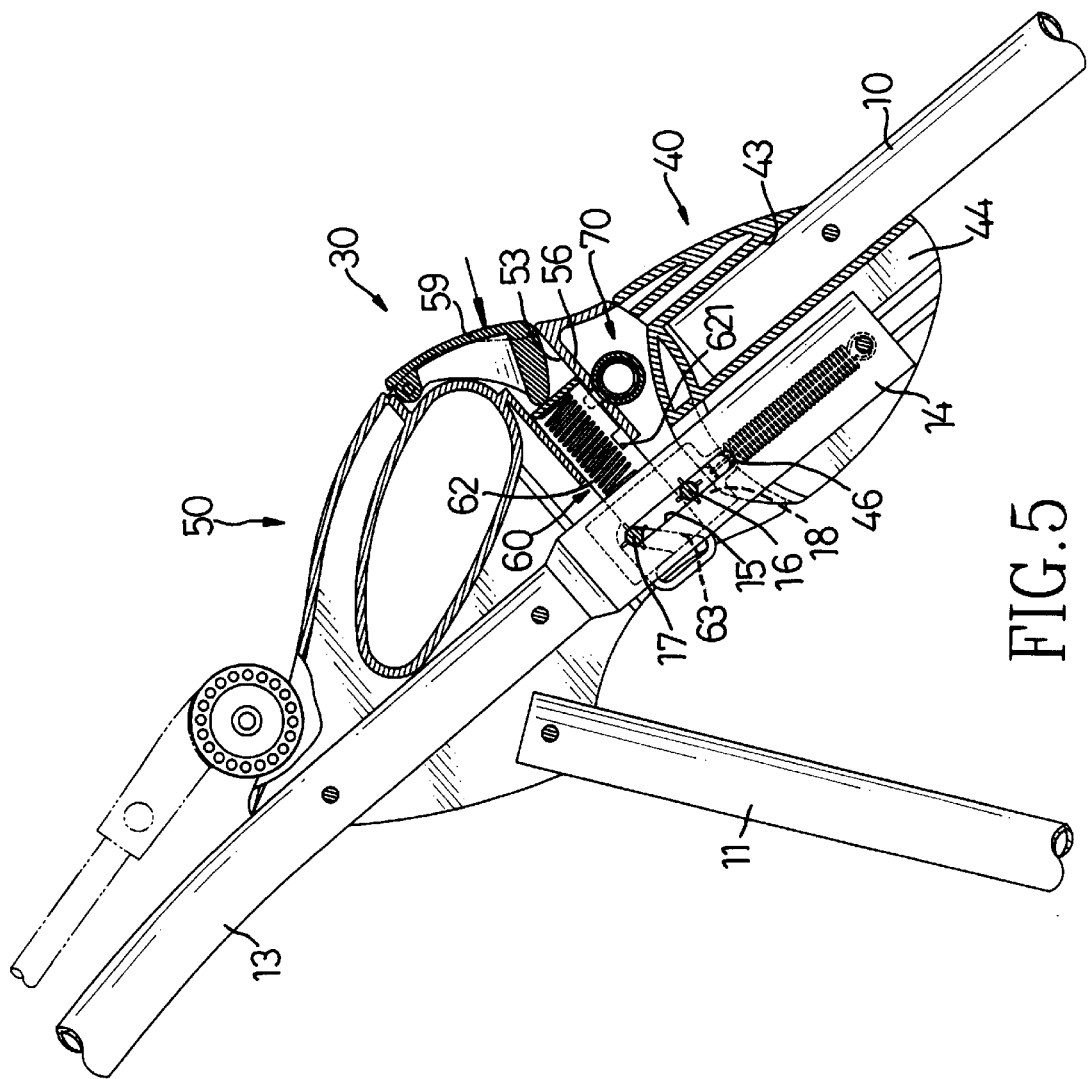
FIG. 5 is an operational view of the folding release device as shown in FIG. 4.
Figure 6:
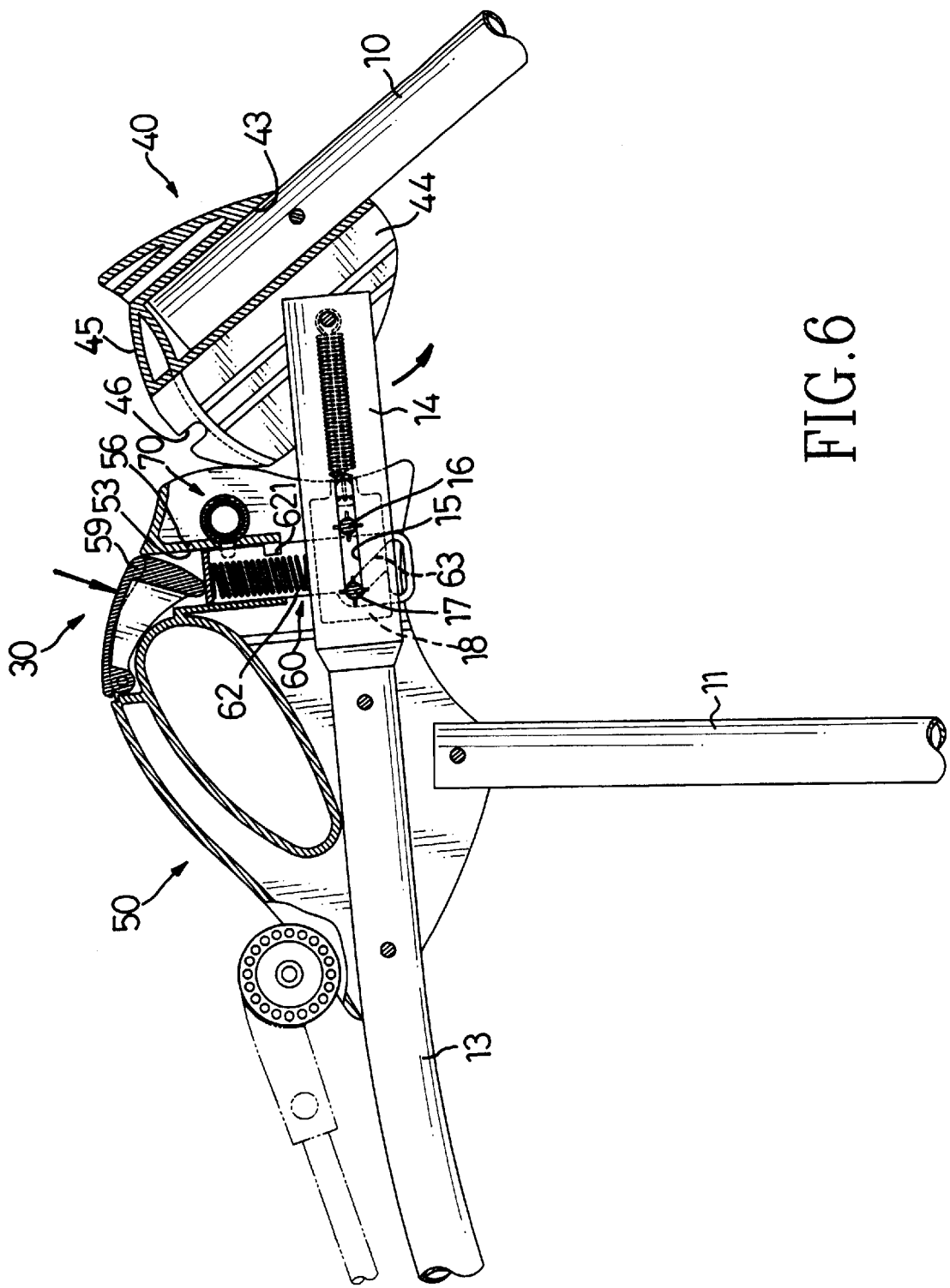
FIG. 6 is an operational view of the folding release device as shown in FIG. 5.
Figure 7:
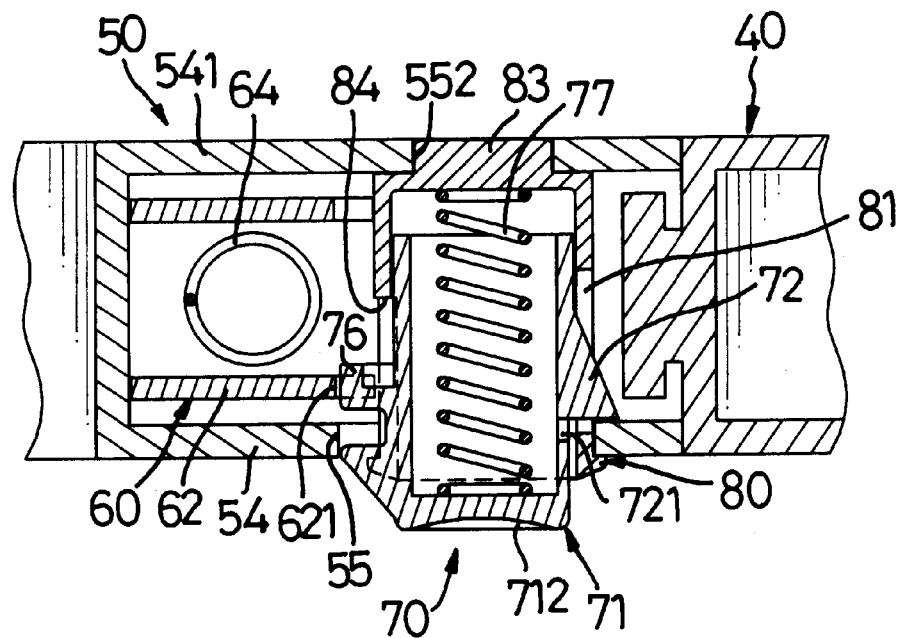
FIG. 7 is a top plan partially cross-sectional view of the folding release device as shown in FIG. 1.

In operation, referring to FIGS. 4–8 with reference to FIGS. 1–3, the stop block (76) is initially received in the retaining notch (621) as shown in FIG. 7 so as to secure the slide bracket (60) by means of the safety knob (70), thereby preventing the slide bracket (60) from moving downward.

Figure 8:
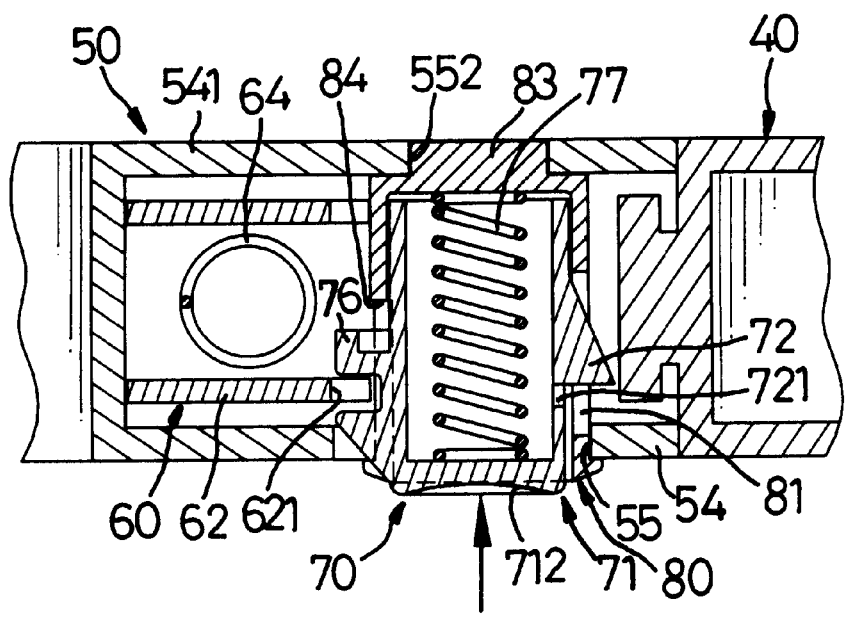
FIG. 8 is an operational view of the folding release device as shown in FIG. 7.

The inner socket (71) is then moved toward the outer socket (80) by means of pressing the press portion (712) to move the stop block (76) from the position as shown in FIG. 7 to the position as shown in FIG. 8, thereby detaching the stop block (76) from the retaining notch (621) such that the slide bracket (60) can be displaced.

Figure 4:
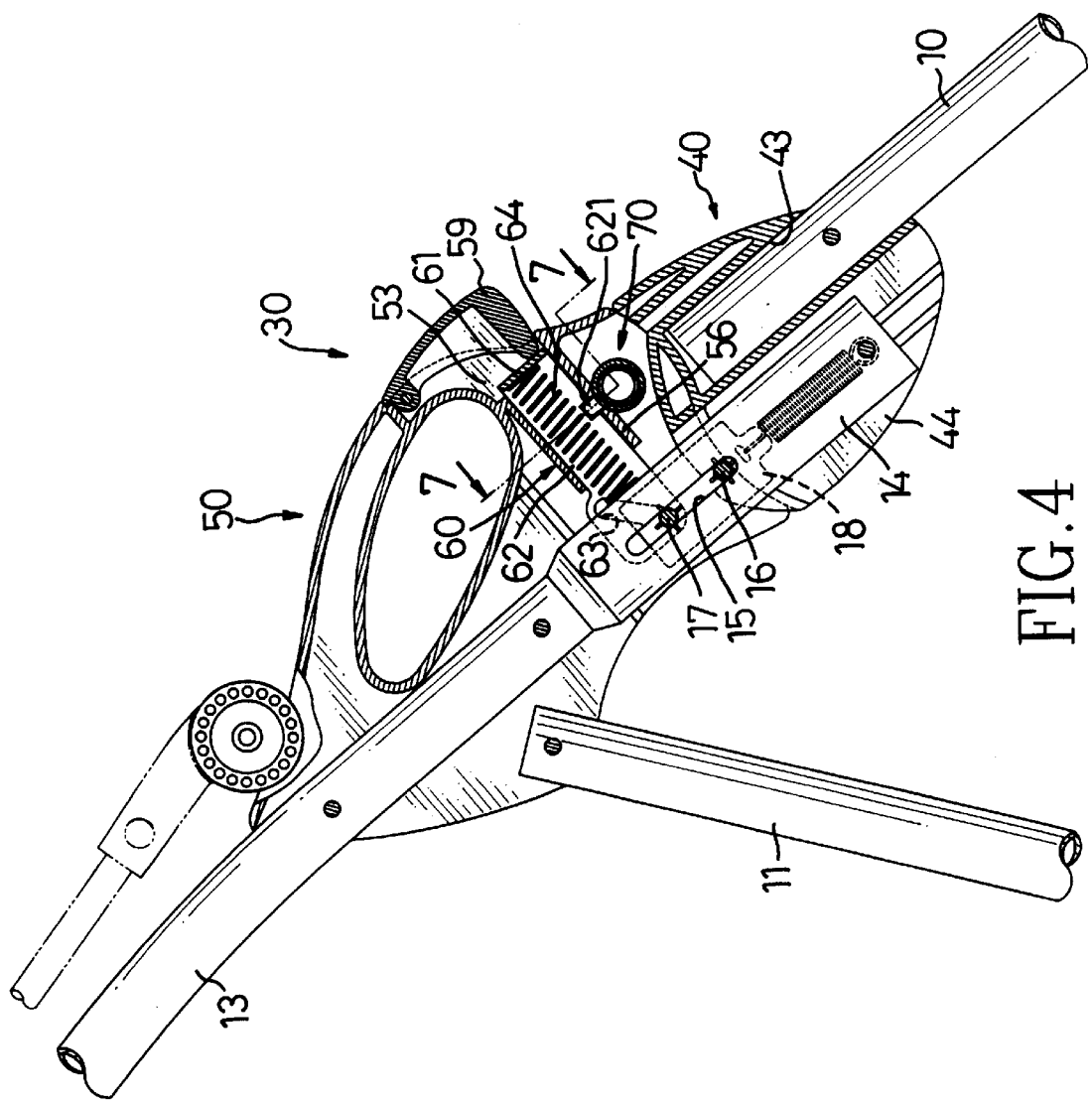
FIG. 4 is an enlarged partially cross-sectional view of the folding release device as shown in FIG. 1.

The slide bracket (60) is then moved downward along the guide plates (56) by means of pressing the push button (59) to move the oblique slot (63) from the position as shown in FIG. 4 to the position as shown in FIG. 5, thereby moving the slide shaft (17) in the guide slot (15) upward from a rightmost position to a leftmost position by guidance of the oblique slot (63).

At the same time, the slide plate (18) is moved with the slide shaft (17) to move the locking shaft (16) upward and leftward from the position as shown in FIG. 4 to the position as shown in FIG. 5 so as to release the locking shaft (16) from the locking cavity (46), thereby detaching the rear coupling base (50) from the front coupling base (40) such that the push bar (13) can be pivoted relative to the front coupling base (40) from the position as shown in FIG. 5 to the position as shown in FIG. 6, thereby folding the stroller (1).

In such a manner, the safety knob (70) can be used to stop the movement of the slide bracket (60), thereby preventing the slide bracket (60) from moving downward to detach the rear coupling base (50) from the front coupling base (40) so as to prevent accidentally folding the stroller (1) due to a person unintentionally pressing the push button (59), thereby providing protection to the stroller (1).

It should be clear to those skilled in the art that further embodiments may be made without departing from the scope and spirit of the present invention.

What is claimed is:

1. A folding release device for a stroller, said stroller comprising a pair of front legs a pair of rear legs, and a substantially inverted U-shaped handle including two push bars, said folding release device comprising:

a front coupling base adapted to be secured on an upper end of each of said two front legs and having a first end and a second end, and a lug extending from said second end of said front coupling base and containing a locking cavity therein;

a hollow rear coupling base adapted to be secured on a lower end of each of said two push bars and pivotally attached to an upper end of each of said two rear legs, said rear coupling base having a first end, a second end and a top, said first end detachably secured to said second end of said front coupling base;

a connecting sleeve having a first end configured to be secured to said lower end of each of said two push bars and a second end pivotally mounted to said front coupling base;

a locking shaft slidably mounted in said connecting sleeve and detachably received in said locking cavity;

a slide bracket slidably mounted in said rear coupling base to move said locking shaft to detach from said locking cavity;

a push button pivotally mounted on said top of said rear coupling base to press said slide bracket downward; and a safety knob mounted in said rear coupling base to stop a movement of said slide bracket.

2. The folding release device in accordance with claim 1, wherein said rear coupling base includes two spaced guide plates mounted therein, said connecting sleeve contains an elongated guide slot defined in the first end thereof, said slide bracket is slidably received between said two guide plates and includes a top plate abutting said push button, and two side plates each abutting said connecting sleeve and each containing an oblique slot aligning with said guide slot, and said folding release device further comprises a slide plate slidably received in said connecting sleeve and having a first end containing a first hole and a second end containing a second hole, and a slide shaft in turn extending through said oblique slot of each of said two side plates of said slide bracket, through said guide slot, and through said first hole, wherein said locking shaft in turn extends through said locking cavity, through said guide slot, and through said second hole.

3. The folding release device in accordance with claim 2, further comprising a biasing member mounted between said top plate of said slide bracket and said connecting sleeve.

4. The folding release device in accordance with claim 2, wherein said rear coupling base contains an opening defined in the top thereof for receiving said push button therein.

5. The folding release device in accordance with claim 2, wherein each of said two side plates of said slide bracket contains a retaining notch therein, and said safety knob includes an outer socket secured in said rear coupling base and containing an elongated slide channel facing said retaining notch, and an inner socket slidably mounted in said outer socket and having a stop block slidably received in said slide channel and detachably received in said retaining notch of one of said two side plates of said slide bracket.

6. The folding release device in accordance with claim 5, wherein said outer socket contains two radially opposite limit slots therein, and said inner socket includes two radially opposite resilient retaining hooks each slidably received in one of said two corresponding limit slots.

7. The folding release device in accordance with claim 6, wherein said inner socket contains two U-shaped slits each defined in the periphery thereof, thereby forming each of said two retaining hooks.

8. The folding release device in accordance with claim 5, wherein said rear coupling base includes a first side wall and a second side wall, said first side wall containing a through hole to receive said outer socket therein.

9. The folding release device in accordance with claim 8, wherein said second side wall of said rear coupling base contains a locking slot therein, and said outer socket includes a rib extending outward and secured in said locking slot.

10. The folding release device in accordance with claim 5, wherein said safety knob further includes a biasing member mounted between said inner socket and said outer socket.

* * * * *